United States Patent [19]

Nagai

[11] Patent Number: 5,457,530
[45] Date of Patent: Oct. 10, 1995

[54] SPECTROMETER PROVIDED WITH AN OPTICAL SHUTTER

[75] Inventor: Yoshiroh Nagai, Osaka, Japan

[73] Assignee: Minolta Co., Ltd., Osaka, Japan

[21] Appl. No.: 290,231

[22] Filed: Aug. 15, 1994

[30] Foreign Application Priority Data

Aug. 27, 1993 [JP] Japan .................. 5-213122

[51] Int. Cl.⁶ .................. G01J 3/04; G01J 3/28
[52] U.S. Cl. .................. 356/330; 356/310
[58] Field of Search .................. 356/310, 330

[56] References Cited

U.S. PATENT DOCUMENTS

| | | | |
|---|---|---|---|
| 4,193,691 | 3/1980 | Fjarlie | 356/330 |
| 4,615,619 | 10/1986 | Fateley | 356/310 |
| 4,799,795 | 1/1989 | Fateley | 356/310 |
| 4,818,867 | 4/1989 | Hayashi et al. | 250/229 |
| 4,887,104 | 12/1989 | Kitano et al. | |
| 5,093,676 | 3/1992 | Matsubara et al. | |
| 5,162,919 | 11/1992 | Ono | 358/302 |

FOREIGN PATENT DOCUMENTS 75171  3/1983  European Pat. Off. .................. 356/330

Primary Examiner—F. L. Evans
Attorney, Agent, or Firm—Price, Gess & Ubell

[57] ABSTRACT

A multi-slit type spectrometer includes a diffractor by which an incident light is diffracted according to wavelengths; an optical shutter array member including a plurality of optical shutter elements arranged in correspondence with wavelength bands diffracted by the diffractor, operable to transmit an incident ray according to an applied voltage, and made of PLZT. Each optical shutter element is applied with a voltage corresponding to the band of the ray incident upon the optical shutter element at a specified timing so that the ray passes through the optical shutter element. The spectrometer further includes a photosensor to convert the ray passed through the optical shutter element to an electrical signal, and a calculator to calculate the intensity of the incident ray for each band in accordance with the electrical signal output from the photosensor and the specified applying timing.

20 Claims, 15 Drawing Sheets

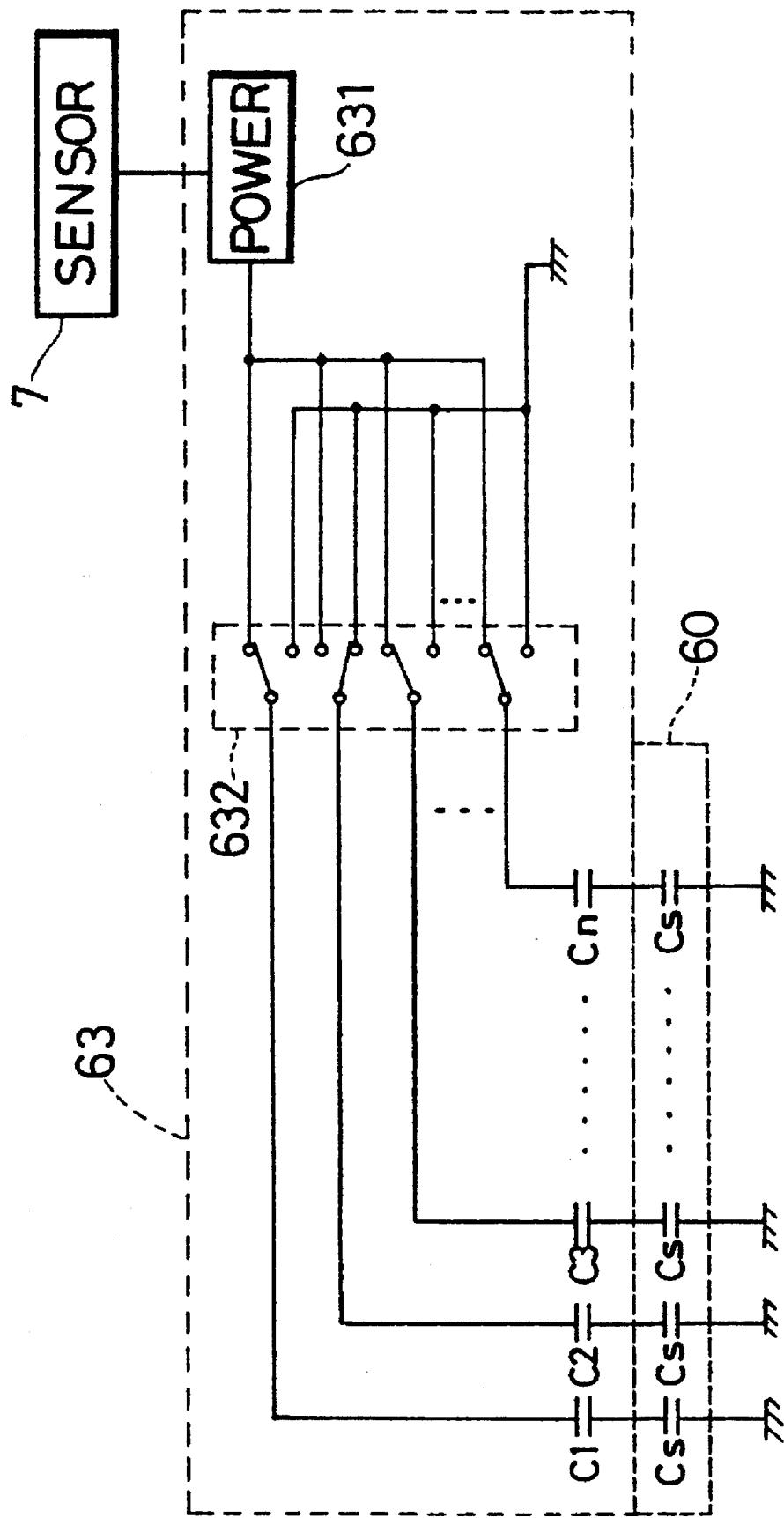

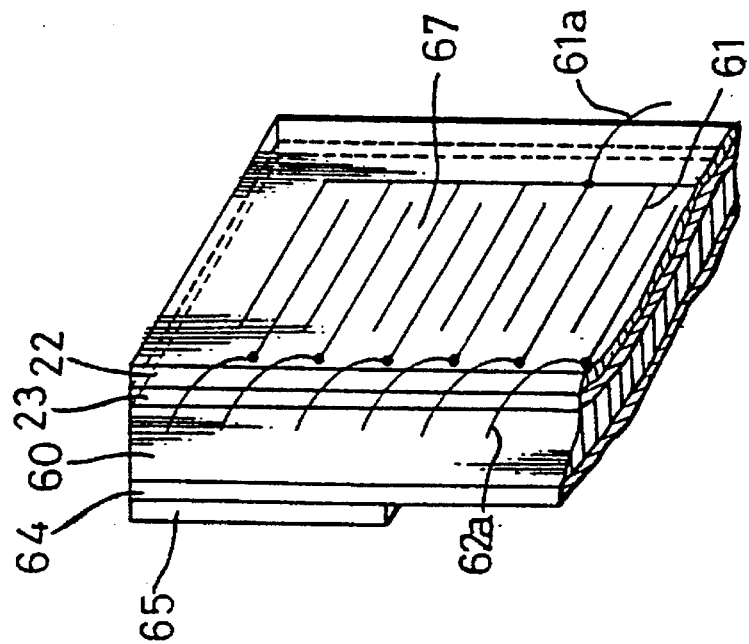
FIG. 8C
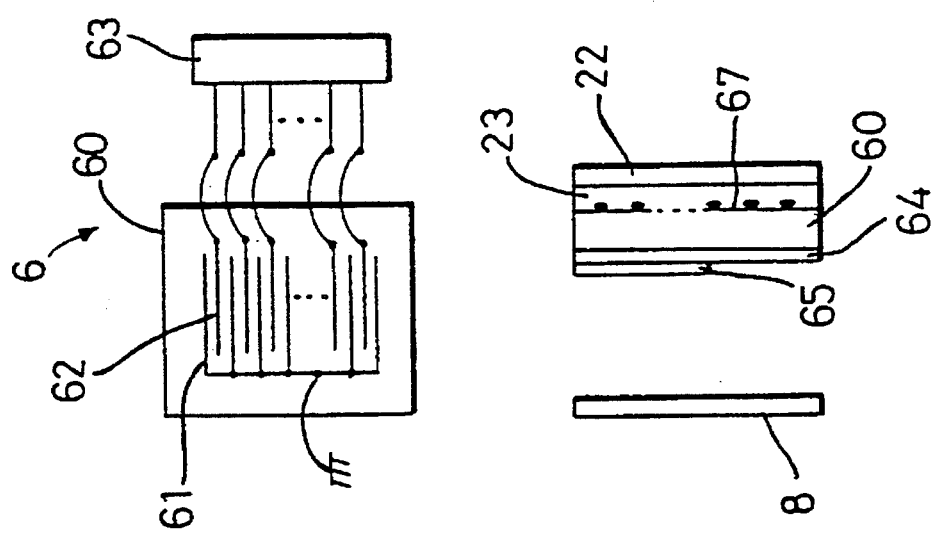
FIG. 8A
FIG. 8B

SPECTROMETER PROVIDED WITH AN OPTICAL SHUTTER

BACKGROUND OF THE INVENTION

1. Field of the Invention

This invention relates to a multi-slit type spectrometer.

2. Description of Prior Art

A lot of attentions have been conventionally given to a non-destructive inspection by use of near infrared spectroscopic analysis. Particularly, there has been a strong demand for an on-line non-destructive inspection in manufacturing industrial products. However, a near infrared spectrometer which is presently in practical use requires a long time for the inspection since a diffraction means such as a diffraction grating is mechanically scanned. This spectrometer is unsuitable to carry out a continuous inspection over a long time since it has a mechanical drive device. In view of this, recently, a multi-slit spectroscopic method has been employed which is suitable to carry out the inspection within a short time has been employed. In order to eliminate the need for the drive device, also, spectrometers have been proposed which have an optical shutter including a multitude of electrically controllable slits.

U.S. Pat. No. 4193691 discloses a spectrometer employing a liquid crystal shutter as an optical shutter. In this spectrometer, an incident light is separated into respective wavelength components by diffraction means and a plurality of liquid crystal shutters are arrayed on an imaging plane of a spectrum. The respective wavelength components are modulated with different frequencies by turning on and off the respective liquid crystal shutters. The modulated rays are again concentrated to one beam, which is detected by a detector. An output signal of the detector is demodulated with the same frequencies as the modulation frequencies of the respective wavelength components, and the intensity of each wavelength component is detected.

Further, spectrometers have been proposed which employ an optical shutter array member formed of dichromic material (U.S. Pat. No. 4615619, U.S. Pat. No. 4799795, Japanese Examined Patent Publication No. 5-6857). The dichromic material has a property of changing from a transparent state to a light reflecting state when the temperature rises. This property of the dichromic material is used to function as an optical shutter. The temperature of the dichromic material is controlled by turning on and off a current applied to this material.

However, the above liquid crystal shutter has a slow responsiveness because of the property of liquid crystal, and cannot be turned on and off at a high speed. It is also relatively difficult to turn on and off the optical shutter made of dichromic material at a high speed because there is a time delay between an actual temperature rise and the start of application of the current. In addition, it is not easy to control the temperature of the dichromic material.

SUMMARY OF THE INVENTION

It is an object of the invention to provide a spectrometer provided with an optical shutter which has overcome the problems residing in the prior art.

It is another object of the invention to provide a spectrometer provided with an optical shutter which is capable of increasing the switching speed of the optical shutter, thereby enabling a high speed response.

The invention is directed to a spectrometer comprising: diffracting means for diffracting an incident light according to wavelengths; an optical shutter array member including a plurality of optical shutter elements, the optical shutter elements being: arranged in correspondence with wavelength bands diffracted by the diffracting means; operable to transmit or block an incident ray according to an applied voltage; and made of PLZT; applying means for applying each optical shutter element with a voltage corresponding to the band of the ray incident upon the optical shutter element at a specified timing so that the ray passes through or is reflected at the optical shutter element; processing means for receiving the ray which has passed through or been reflected at the optical shutter element and outputting an electrical signal according to the intensity of the received ray; and light intensity calculating means for calculating the intensity of the incident ray for each band in accordance with the electrical signal output from the processing means and the specified applying timing.

It may be appreciated to further provide first condenser means for concentrating diffracted rays for specified wavelength bands, and a second condenser means for concentrating the ray which has passed through or reflected at the optical shutter element.

The applying means may be provided with voltage calculation means for calculating for each band an application voltage necessary for the corresponding optical shutter element to transmit the ray having a wavelength which falls within this band; and voltage application means in responsive to the voltage calculation means for applying the calculated voltages to the respective optical shutter elements.

Further, the applying means may be provided with temperature detecting means for detecting the temperature of the optical shutter array member; and the voltage calculation means for calculating an application voltage for each band in consideration of the detected temperature.

It may be appreciated that the applying means is constructed by voltage application means for applying the optical shutter elements with their respective corresponding voltages at different applying intervals; and the light intensity calculating means may be constructed by converting means for converting electrical signal outputs from the processing means to digital data at specified sampling timings; and calculating means for calculating the intensity of the ray for each band by Fourier-transforming the digital data.

According to the invention, rays diffracted in a wavelength direction are concentrated for respective specified bands and are caused to be incident upon respective optical shutter elements arrayed in correspondence with the positions of the respective bands. The optical shutter elements are made of PLZT. Each optical shutter element is turned on and off by applying a voltage corresponding to the band of the incident ray at a specified timing, thereby modulating the incident ray to transmit or block the ray. The ray which has passed through or been reflected at the optical shutter is processed to an electrical signal according to the intensity of the ray. The intensity of the incident ray is calculated for each band in accordance with the electrical signal and the on-off timing information of the respective optical shutter element.

Transmission and blockage of incident rays are performed by turning on and off the optical shutter elements which are made of PLZT having a high electrooptical effect. Accordingly, the transmission and blockage of each incident ray can be switched at a high speed, which thus increases the response speed of a spectrometer.

The half-wavelength voltage varies depending upon the temperature of the optical shutter. The applied voltage is controlled to be an optimal voltage in accordance with the temperature of the optical shutter array member which is detected by the temperature detecting means. Accordingly, the transmission and blockage of incident rays can be performed more accurately.

Also, the optical shutter elements are applied with respective corresponding voltages at different applying intervals. Processed electrical signal outputs are converted to digital data at specified sampling timings. The digital data are Fourier-transformed to calculate the intensity of the ray for each band. Thus, the intensity of each ray can be calculated at higher speed.

These and other objects, features and advantages of the present invention will become more apparent upon a reading of the following detailed description and accompanying drawings.

BRIEF DESCRIPTION OF THE DRAWINGS

FIG. 3 is a circuit diagram showing an exemplary construction of a drive device of the first spectrometer;

FIGS. 8A, 8B and 8C are diagrams showing a construction of a modification of the optical shutter array member of the second spectrometer, FIG. 8A being a front view, FIG. 8B a side view, and FIG. 8C a partially enlarged perspective view;

DETAILED DESCRIPTION OF THE PREFERRED EMBODIMENTS OF THE INVENTION

Figure 1:
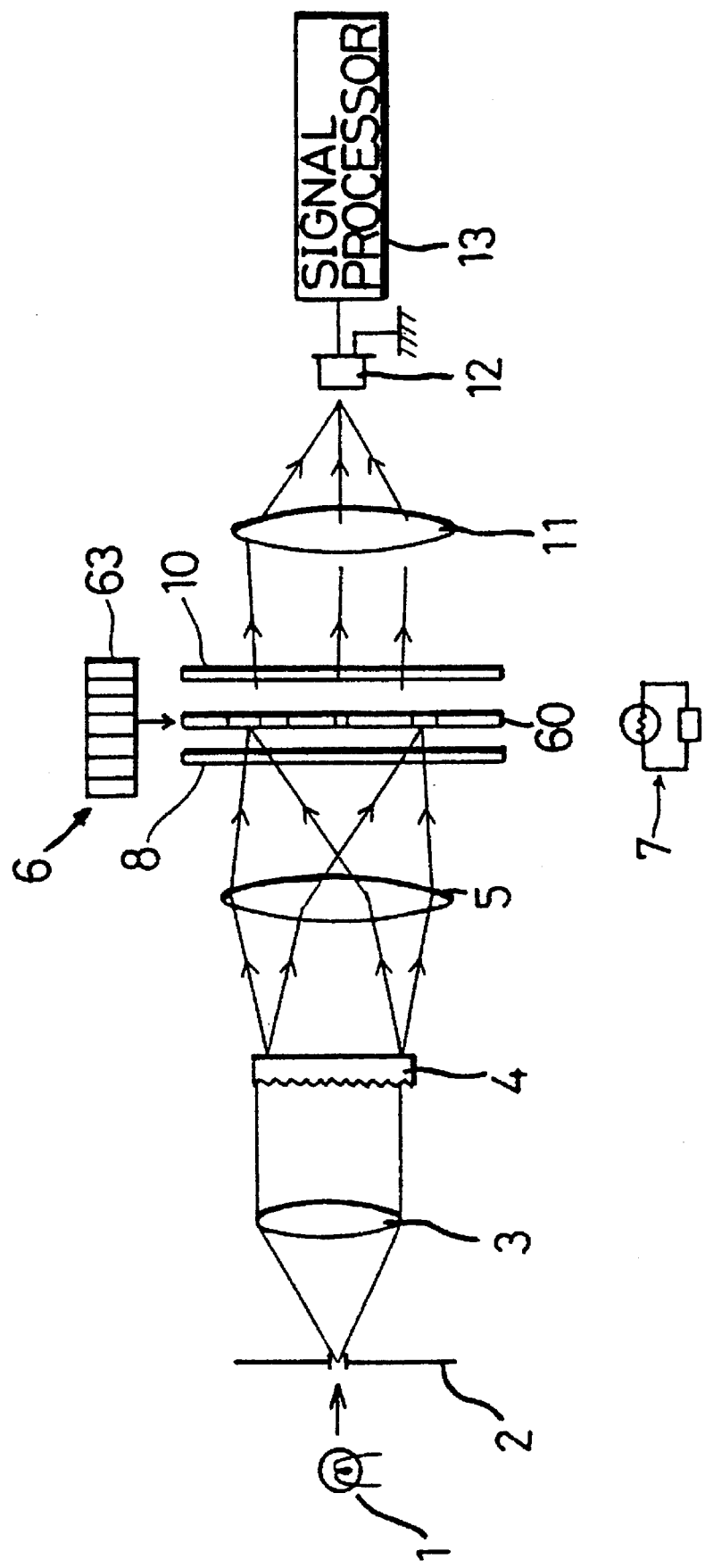
FIG. 1 is a diagram showing a schematic construction of a first spectrometer provided with an optical shutter embodying the invention.

A first spectrometer embodying the invention will be described with reference to FIGS. 1 to 4. FIG. 1 is a diagram showing a schematic construction of the first spectrometer.

A light source 1 is adapted to emit a light to be analyzed by this spectrometer. The light to be analyzed may be a light from the light source itself, or a light from a sample. A slit plate 2 is a nontransparent plate having a narrow slit formed at a given position. The light from the light source 1 is caused to pass through this slit planar manner. In the case where a transmittance characteristic or reflection characteristic of a sample is measured, the spectrometer may be constructed such that a light is directed to the sample and the light which has passed through or is reflected by the sample is incident upon the slit plate 2.

A first optical system 3 includes an optical lens or the like, and makes the light which has passed through the slit plate 2 into a parallel light. A diffraction device 4 includes a prism, diffraction grating, or the like, and diffracts the incident parallel light at an angle according to a wavelength. A second optical system 5 concentrates the diffracted rays to an optical shutter to be described for each wavelength.

An optical shutter device 6 includes an optical shutter array member 60, a polarizer 8, an analyzer 10, a drive device 63, etc. and modulates the incident rays for each wavelength. As the polarizer 8 and analyzer 10 are used, for example, a polarizing film made of polyvinyl alcohol and iodine, a wire grid polarizer in which aluminum conductors are drawn in parallel on a substrate such as $CaF_2$, and the like. The polarizer 8 and analyzer 10 transmit only linear polarized components of the incident rays, and are positioned before and after the optical shutter array member 60 with respect to a propagating direction of rays, respectively. Further, they are disposed such that their respective polarizing angles are right angle to each other.

A condenser lens 11 includes an optical lens and concentrates the rays modulated by the optical shutter device 6 on a detector 12. The detector 12 includes a photoelectric conversion element such as a PbS photocell, and outputs an electrical signal representing the intensity of the incident light. A signal processor 13 carries out a signal processing in accordance with the output signal of the detector 12. The operation of the signal processor 13 will be described in more detail later.

Figure 2C:
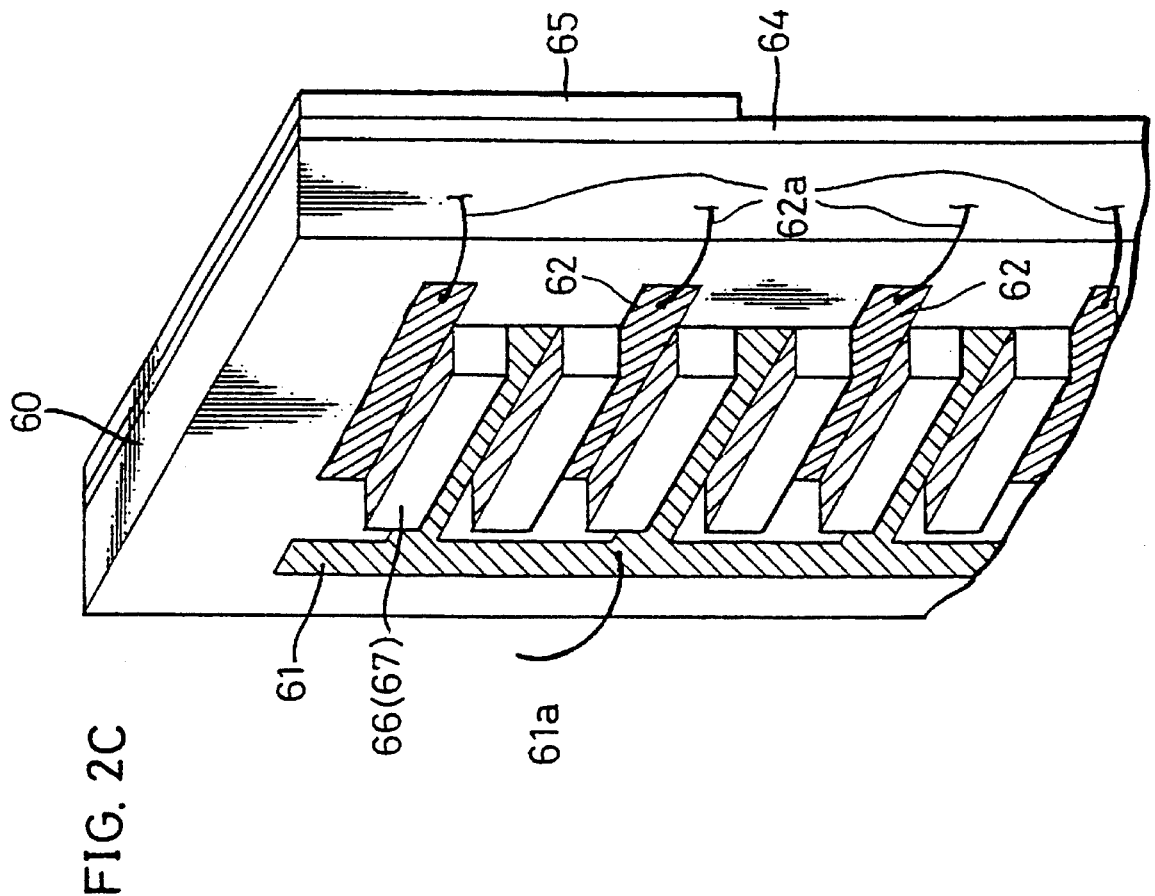
FIGS. 2A, 2B and 2C are diagrams showing a construction of an optical shutter array member of the first spectrometer, FIG. 2A being a front view, FIG. 2B a side view, and FIG. 2C a partially enlarged perspective view.
Figure 2A:
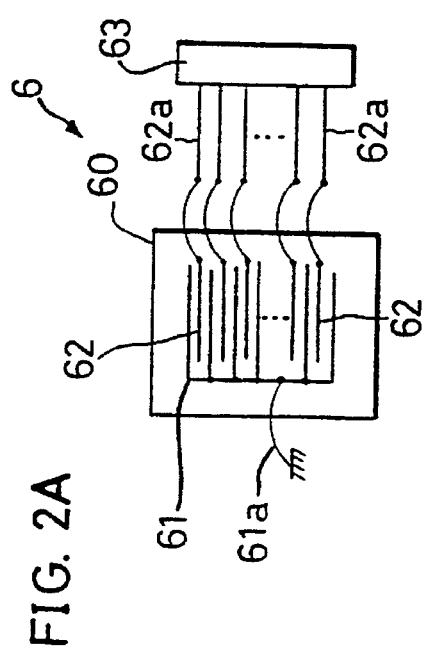
Figure 2B:
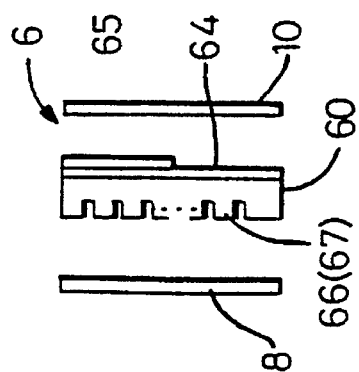

The optical shutter array member 60 is made of material having a large electrooptical effect such as PLZT (lead lanthanum zirconate titanate) and has a plate-like shape as shown in FIG. 2.

Figure 15:
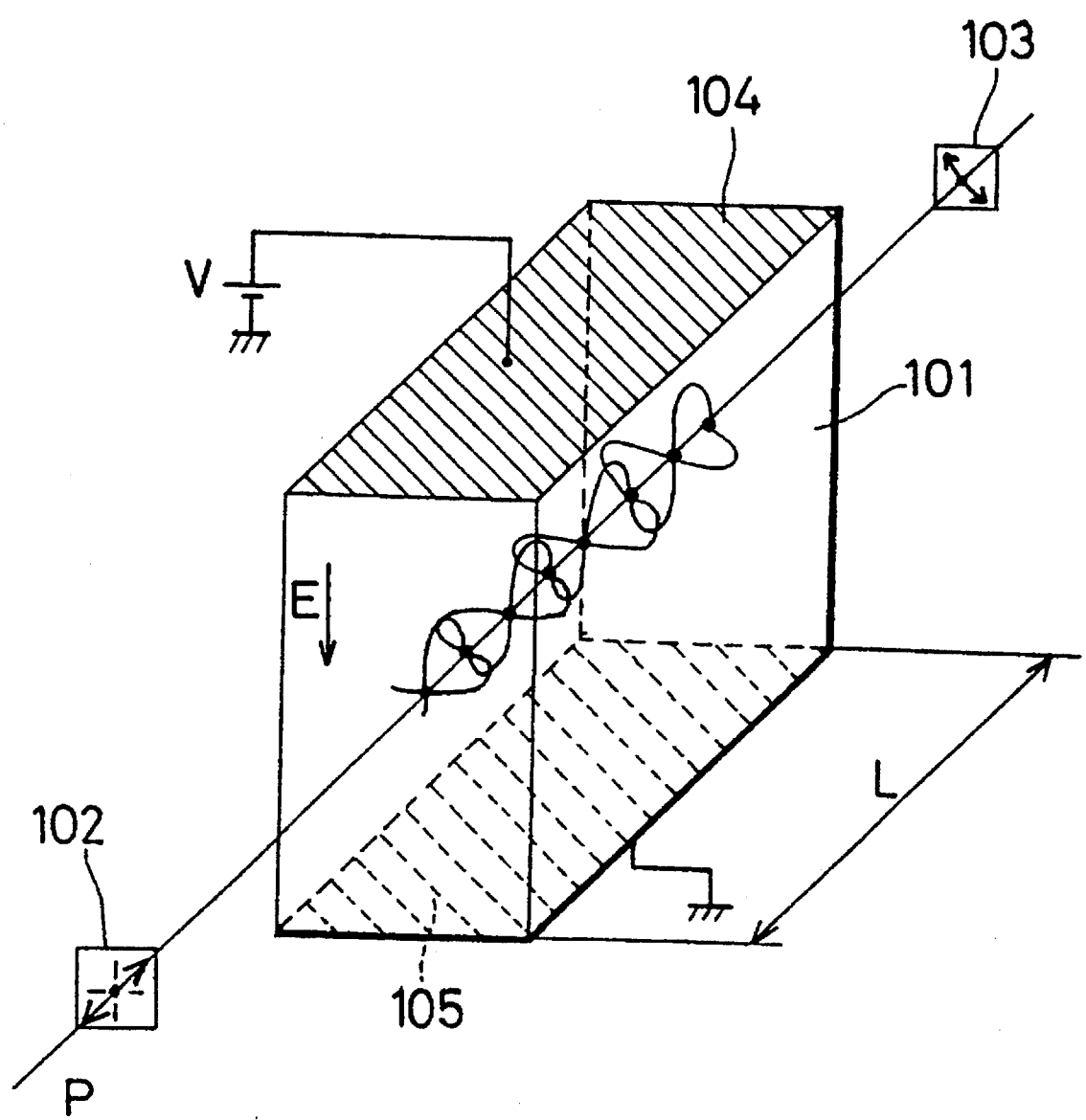
FIG. 15 is a diagram showing the principle of an electrooptical effect.
Figure 16:
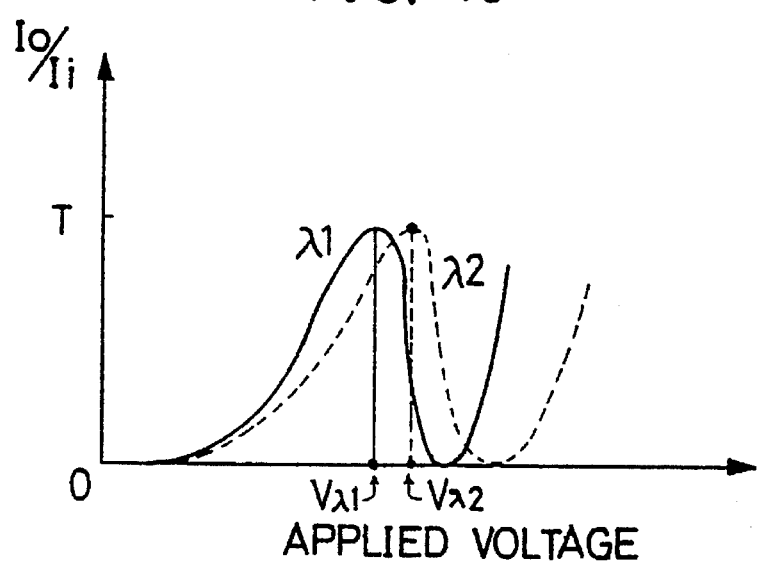
FIG. 16 is a graph showing a characteristic of transmittance of an optical shutter device having an electrooptical effect material in relation to an applied voltage.
Figure 17:
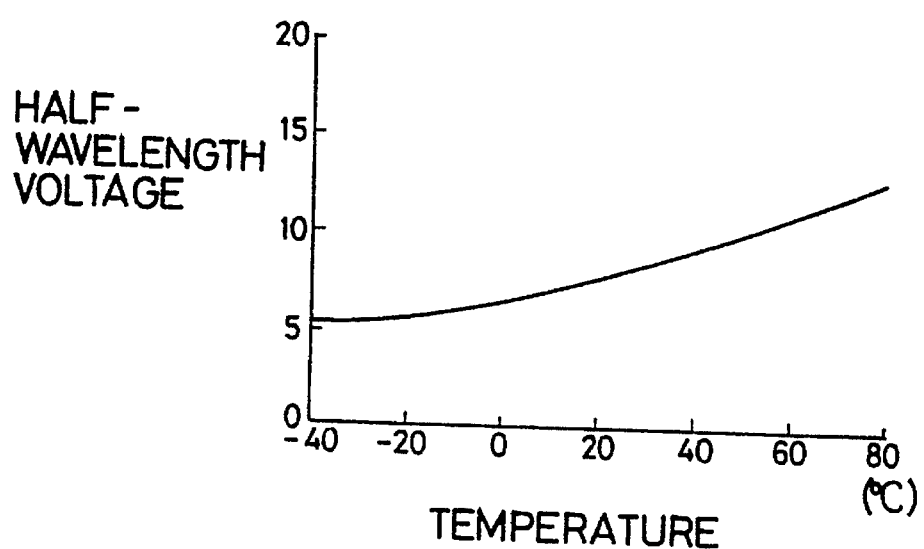
FIG. 17 is a graph showing a characteristic of a half-wavelength voltage in relation to a temperature of an electrooptical effect material of PLZT.

Next, the principle of an electrooptical effect will be described with reference to FIGS. 15 to 17. FIG. 15 shows an optical arrangement including a medium 101 made of material such as PLZT having a large electrooptical effect, a polarizer 102 and an analyzer 103 positioned before and after the medium 101 on an optical path P of an incident light, respectively. The polarizer 102 and analyzer 103 transmit only linear polarized components of the incident light thereof, and are disposed such that the polarizing angle of the polarizer 102 is right angle to that of the analyzer 103. An electrode 104 is connected to a power supply V via an unillustrated switch device and an electrode 105 is connected to a ground, so that a voltage can be applied to the medium 101.

In a state where no voltage is applied, the medium 101 is optically isotropic, thus the linear polarization light incident thereon is not subject to any change while passing through the medium 101. Since the analyzer 103 is disposed in a position orthogonal to the polarizer 102, the light is blocked by the analyzer 103 and therefore does not pass therethrough.

When a voltage is applied between the electrodes 104 and 105, the index of refraction changes in a direction normal to the one parallel with an electric field E, i.e., the birefringence occurs. When the medium 101 takes on the Kerr effect which is one type of the electrooptical effects, the index of birefringence expressed as in the following equation (1).

$$\Delta n = -n^3 \cdot R \cdot E^2 / 2 \qquad (1)$$

where n denotes an index of refraction of the medium 101, E an electric field, and R a Kerr constant of the medium 101.

When the light passes through the medium displaying the birefringence, a phase difference arises between ordinary rays and extraordinary rays. This phase difference $\Gamma$ is expressed as in the following equation (2).

$$\Gamma = \Delta n \cdot L \cdot 2\pi/\lambda \qquad (2)$$

where L denotes a length of an optical path and $\lambda$ a wavelength. When the phase difference $\Gamma$ becomes 180 degrees, the polarized direction of the linear polarization light rotates by 90 degrees. In order to make the phase difference $\Gamma$ greater, the index of birefringence $\Delta n$ or the length of the optical path L may be made greater as is clear from the equation (2). In order to make greater the index of birefringence of the medium displaying the electrooptical effect, the applied voltage may be increased.

The light having components in a polarization direction of the analyzer 103 and an intensity expressed in the following equation (3) passes through the analyzer 103.

$$\begin{aligned} Io &= T \cdot Ii \cdot \sin^2(\Gamma/2) \\ &= T \cdot Ii \cdot \sin^2(\Delta n \cdot L \cdot \pi/\lambda) \end{aligned} \qquad (3)$$

where $I_o$ denotes an intensity of the passed light coming out of the analyzer 103, Ii an intensity of the incident light coming into the polarizer 102, $\lambda$ a wavelength, T a transmittance of this optical arrangement when the analyzer 103 and the entire medium 101 are in parallel relationship as in the Nicol prism.

As seen from the equations (1) and (2), the phase difference changes when the applied voltage from the power supply V is changed. Accordingly, the transmittance of this optical arrangement, that is, $I_o/Ii$, changes with the change in the applied voltage. FIG. 16 is a graph showing the transmittance of this optical arrangement in relation to the applied voltage. Since the analyzer 103 and polarizer 102 are in orthogonal relationship, the transmittance is at maximum when the phase difference is half the wavelength. Here, a voltage which causes a phase difference corresponding to half the wavelength is referred to as a half-wavelength voltage (indicated by V$\lambda$1, V$\lambda$2 in FIG. 16) for the sake of convenience.

Also, the half-wavelength voltage varies depending upon the temperature of the medium 101. FIG. 17 shows a relationship between the half-wavelength voltage and the temperature of the medium of PLZT. Accordingly, the applied voltage should be controlled to be an optimal voltage in accordance with the temperature of the medium 101, i.e., to be a half-wavelength voltage.

Referring now to FIGS. 2A to 3C, the array member 60 formed with a plurality of projections 66 in the form of a laterally long rectangular parallelepiped on a light incident side thereof. In recesses formed between projections 66 are alternately formed a common electrode 61 and individual electrodes 62 (hatched portions in FIG. 2C) by means of the deposition or the like. Specifically, each individual electrode 62 is positioned between teeth of the comb-shaped common electrode 61.

The common electrode 61 is connected to a ground via a lead wire 61a, and the individual electrodes 62 are connected to the drive device 63 via lead wires 62a, respectively. An optical shutter element 67 is formed on each projection 66 between the tooth of the common electrode 61 and its corresponding individual electrode 62. When a voltage is applied to the projection 66 by the electrodes 61 and 62, the corresponding optical shutter element 67 is turned on, and the ray consequently transmits through the analyzer 10. On the other hand, when no voltage is applied, the element 67 is turned off, and the ray is consequently blocked by the analyzer 10.

The optical path of the light passing through the optical shutter array member 60 is lengthened by the presence of the projection 66. Thus, it is possible to cause a large phase difference in the transmitted light with a small applied voltage as seen from the equation (2).

Reflection preventing film 64 is provided on the optical shutter array member 60. The film 64 is made of a coating material to reduce the reflection, and is formed on the surface of the optical shutter array member 60 by means of the deposition. Materials having a large electrooptical effect such as PLZT have a high index of refraction, and have a high reflectance and a low transmittance. Accordingly, the film 64 is provided to improve the transmittance of the optical shutter array member 60 by reducing the reflection.

A high-order diffracted ray blocking filter 65 is formed by means of the deposition at a part of a rear surface of the optical shutter array member 60 where the rays having long wavelengths come out and block high-order diffracted rays produced by the diffraction device 4. In the case where a first order diffracted ray having a wavelength $\lambda$ is diffracted in a certain direction by the diffraction grating constituting the diffraction device 4, a second order diffracted ray having a wavelength of $\lambda/2$ and a third order diffracted ray having a wavelength of $\lambda/3$ are also diffracted in the same direction. Hence, high-order diffracted rays as well as the rays having a predetermined wavelength pass through the respective optical shutter elements 67.

Thus, these high-order diffracted rays are blocked by the filter 65, so that only the first order diffracted ray can be measured.

The dimensions of the filter 65 are determined by a measurable wavelength range of this spectrometer. For example, if this range is between 1 and 4 μm, the second order diffracted rays having a wavelength of 1 to 2 μm are incident on the optical shutter on which the first order diffracted rays having a wavelength of 2 to 4 μm concentrate. Further, the third order diffracted rays having a wavelength of 1 to 4/3 μm are incident on the optical shutter on which the first order diffracted rays having a wavelength of 3 to 4 μm concentrate. In this case, such a high-order diffracted ray blocking filter 65 as to block the rays having a wavelength of shorter than 2 μm may be formed in a region covering the optical shutter element 67 to which the first order diffracted rays having a wavelength of 2 to 4 μm concentrate.

For example, in the case of blocking rays having a wavelength of 1 μm or shorter, the filter 65 may be made of silicon, or the like. It may also appropriate to form by means of the deposition a multi-layer film made of dielectric substance such as zinc sulfide and magnesium fluoride to transmit the rays whose wavelength falls within a set wavelength range and reflect the rays having the wavelengths of the high-order diffracted rays.

It is designed to improve the spectral sensitivity or performance by the reflection preventing film 64 and the high-order diffracted ray blocking filter 65.

The drive device 63 is an electrical circuit which includes a power supply unit 631, a switch unit 632, etc. and is constructed such that desired voltages are applied to the respective individual electrodes 62 via capacitors C1 to Cn.

Since the optical shutter element 67 is formed of a dielectric material, it is equivalent to a capacitor in an electric circuit. Accordingly, a voltage obtained by dividing a supply voltage by the respective optical shutter elements 67 and the capacitors C1 to Cn is applied to the respective individual electrodes 62.

Rays having different wavelengths are incident on the respective optical shutter elements 67. The capacity of the respective capacitors C1 to Cn is selected such that the voltage applied to the optical shutter element 67 is an optimal voltage for the wavelength of the ray incident on this element 67, i.e., a half-wavelength voltage. Each optical shutter element 67 transmits a maximal amount of rays when it is turned on, i.e., a voltage is applied.

A temperature sensor 7 includes a thermistor is disposed in proximity to the optical shutter array member 60 for detecting the temperature of the array member 60. As shown in FIG. 17, the property of the optical shutter array member 60 is such that the half-wavelength voltage change as the temperature changes. Thus, the power supply unit 631 is provided with a correcting circuit for correcting the voltage applied to the optical shutter element 67 to the half-wavelength voltage in accordance with the detected temperature from the temperature sensor 7.

Although the voltages are applied to the respective optical shutter elements 67 via the capacitors C1 to Cn in this embodiment, the half-wavelength voltages may be applied individually and directly to these elements 67.

Figure 4:
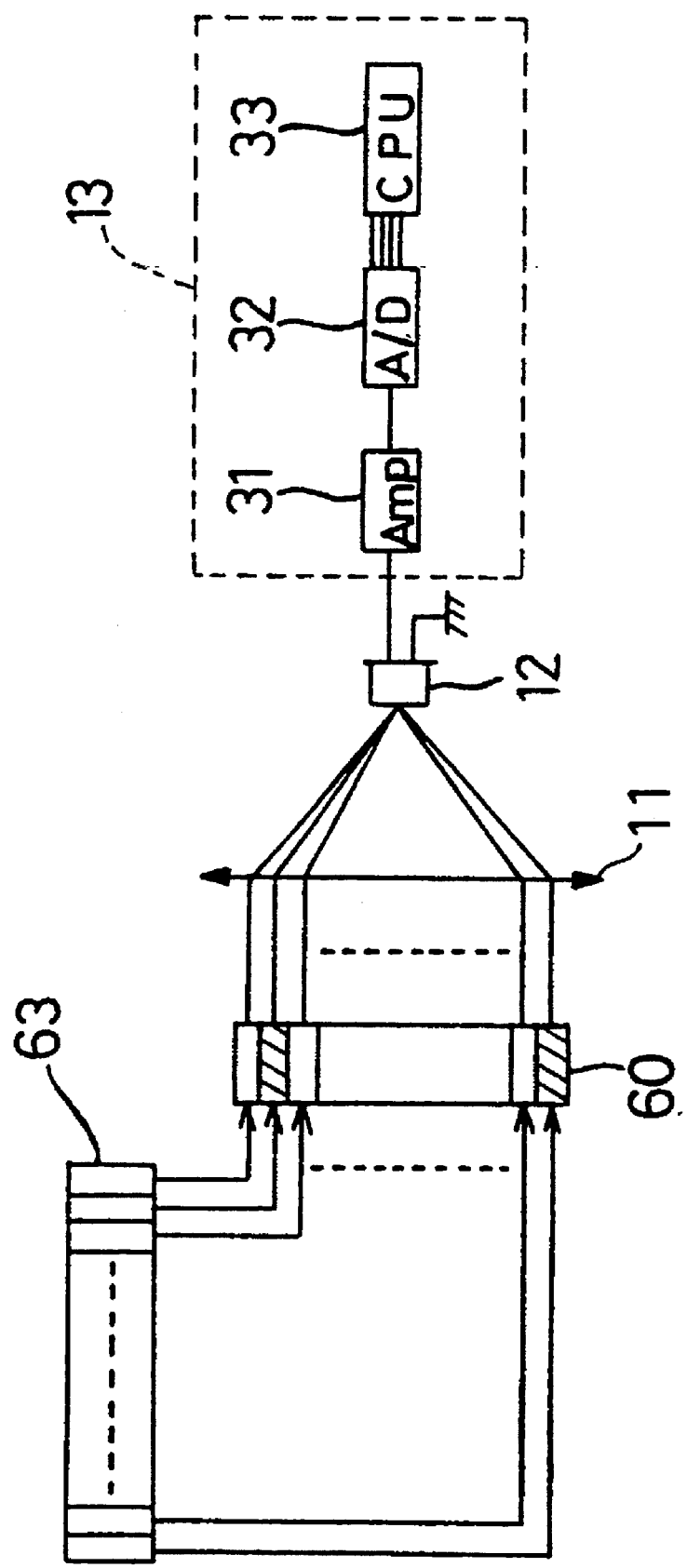
FIG. 4 is a circuit diagram showing a signal processor of the first spectrometer.
Figure 5A:
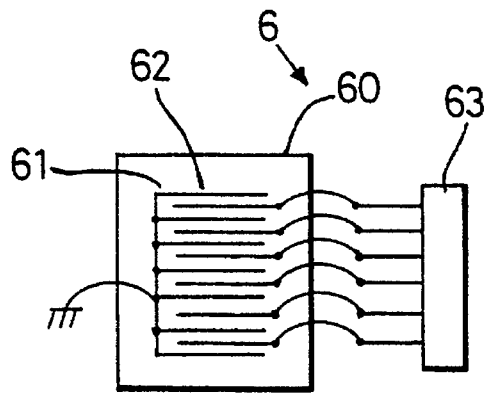
FIGS. 5A, 5B and 5C are diagrams showing a construction of a modification of the optical shutter array member of the first spectrometer, FIG. 5A being a front view, FIG. 5B a side view, and FIG. 5C a partially enlarged perspective view.
Figure 5B:
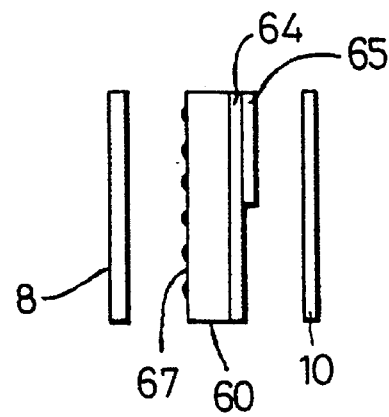
Figure 5C:
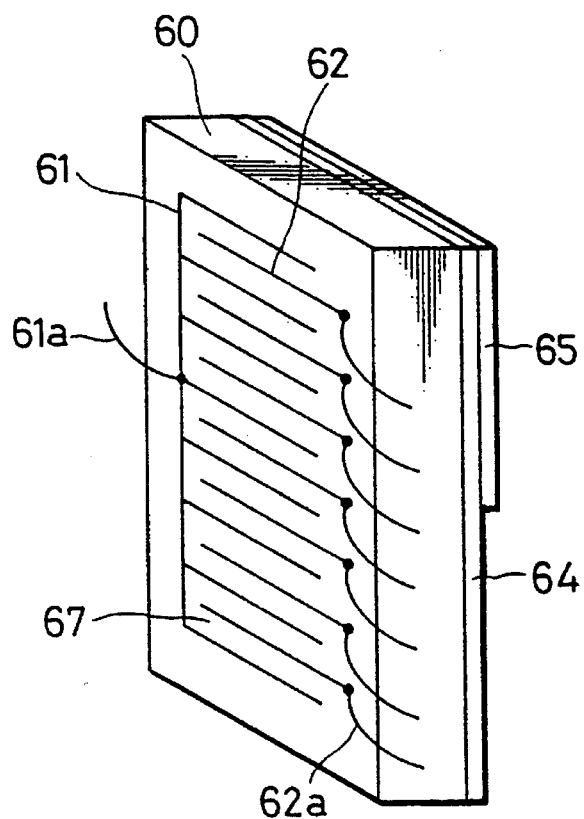

The signal processor 13 will be next described with reference to FIG. 4. FIG. 4 is a diagram showing a schematic construction of a drive system for the optical shutter array member 60 and the signal processor 13. In the first embodiment, the Hadamard's transform spectral method is employed and the optical shutter array member 60 includes optical shutter elements 67. In this case, the number of the optical shutter elements 67 is N.

The signal processor 13 includes an amplifier 31, an analog-digital (A/D) converter 32, a CPU 33, and the like. The amplifier 31 amplifies an output signal of the detector 12. The A/D converter 32 converts the amplified output signal into a digital value. The CPU 33 calculates the intensity of the incident light for each wavelength in accordance with the Hadamard's transform spectral method.

Next, a measurement in accordance with the Hadamard's transform spectral method will be described. In the case where measurements are made M times by changing the on-off pattern of the respective optical shutter elements 67, an output signal Xi (i=1, 2, . . . , M) of the detector 12 in the i-th measurement is expressed in the following equation (4).

$$Xi = \sum_{j=1}^{n} WijYj \quad (i=1, 2, \ldots, M) \tag{4}$$

where Wij denotes a factor indicating whether an optical shutter element in the j-th position is open or closed during the i-th measurement and is expressed as shown in the following equation (5), and Yj denotes an intensity of a ray incident upon the j-th optical shutter element.

$$Wij = \begin{cases} 1 & \text{(open)} \\ 0 & \text{(closed)} \end{cases} \tag{5}$$

The equation (4) is expressed as shown in the following equation (6), using a matrix [Wij] and row vectors {Xi}, {Yj}.

$$\{Xi\}=\{Yj\}[Wji] \tag{6}$$

Thus, a spectral intensity of each optical shutter element, i.e., each wavelength can be calculated using the following equation (7). At this time, the matrix [Wij] which makes measurement error smallest can be derived using the Hadamard's matrix.

$$\{Yj\} = \begin{cases} \{Xi\}[Wji]^{-1} & (M=N) \\ \{Xi\}[Wij]\;([Wji][Wij])^{-1} & (M>N) \end{cases} \tag{7}$$

The optical shutter array member 60 may have the shape of a rectangular parallelepiped, and the comb-shaped common electrode 61 and the individual electrodes 62 may be arranged on the surface of the array member 60, each individual electrode 62 being located between two neighboring teeth of the common electrode 61, so that an optical shutter element 67 is formed between an individual electrode 67 and its corresponding tooth of the common electrode 61. In this way, the optical shutter array member 60 can be formed easily.

Figure 6:
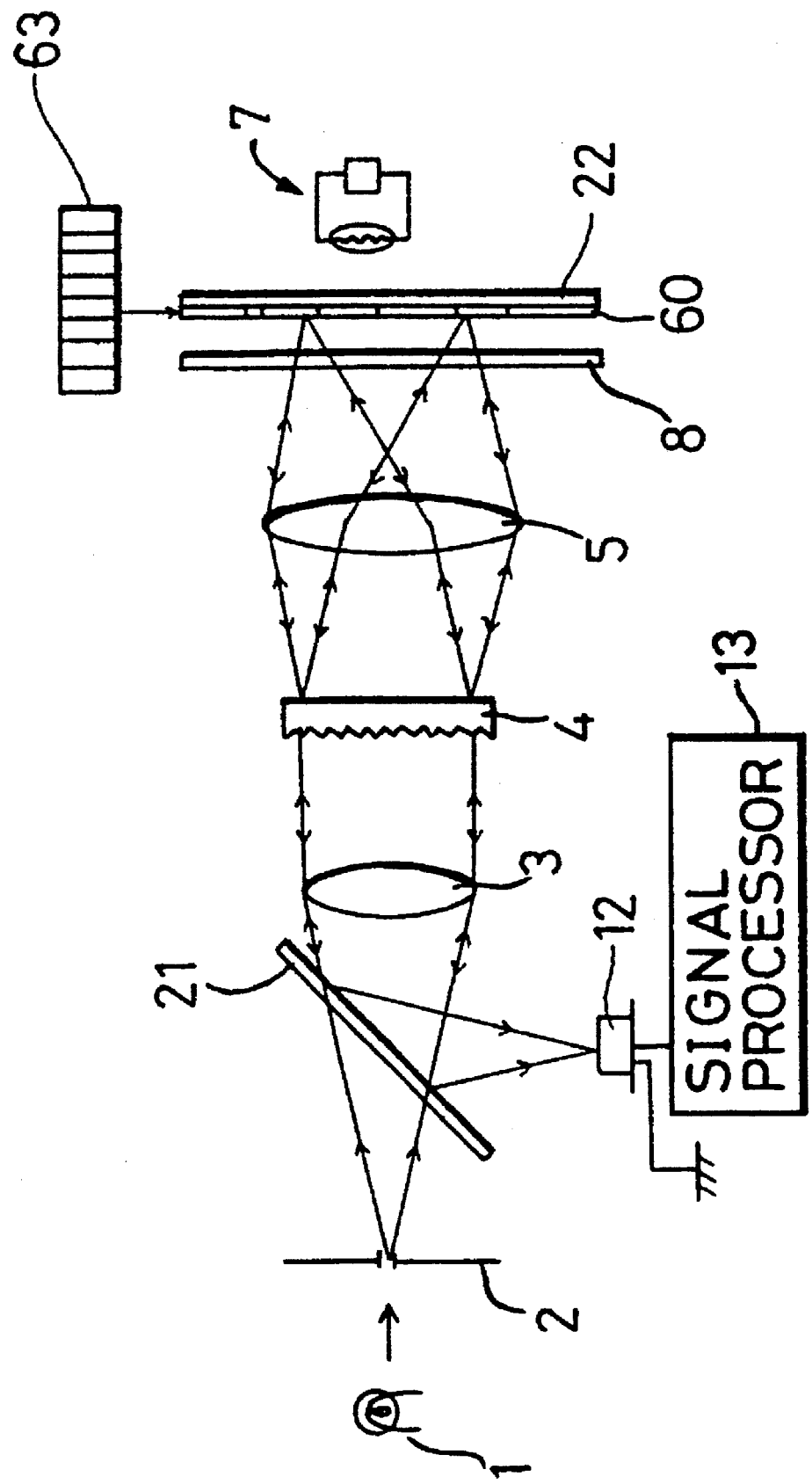
FIG. 6 is a diagram showing a schematic construction of a second spectrometer embodying the invention.

A second spectrometer provided with an optical shutter will be described next with reference to FIGS. 6 to 7C. FIG. 6 is a diagram showing a schematic construction of a second spectrometer embodying the invention, and FIGS. 7A, 7B and 7C are front, side and partially enlarged perspective views respectively showing a construction of an optical shutter array member 60 of the second spectrometer. It will be appreciated that like reference numerals are given to parts having like functions as those in the first embodiment.

The second spectrometer employs a reflection type optical system, thereby shortening the length of the optical system and, for that matter, making the apparatus itself smaller.

A semitransparent mirror 21 is disposed between a slit plate 2 and a first optical system 3. This mirror 21 transmits the light from the slit plate 2 and reflects the light concentrated by the first optical system 3 to focus the same on a detector 12.

Figure 7C:
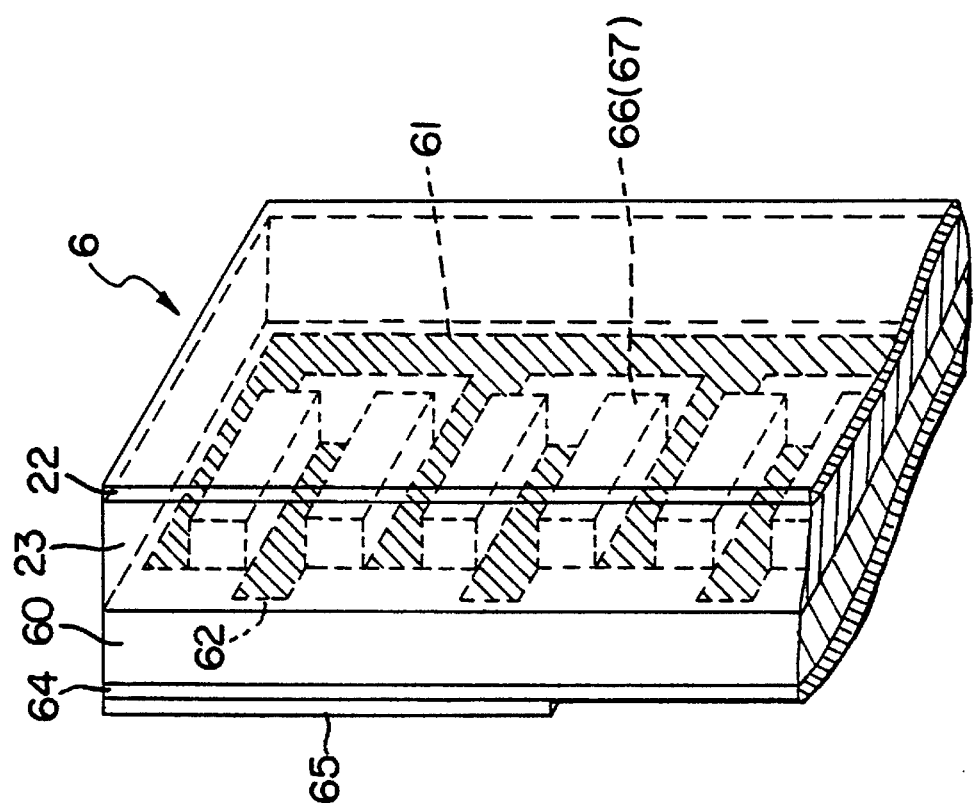
FIGS. 7A, 7B and 7C are diagrams showing a construction of an optical shutter array member of the second spectrometer, FIG. 7A being a front view, FIG. 7B a side view, and FIG. 7C a partially enlarged perspective view.
Figure 7A:
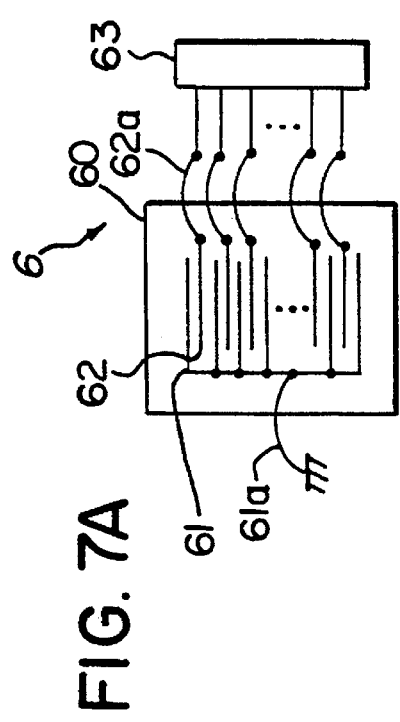
Figure 7B:
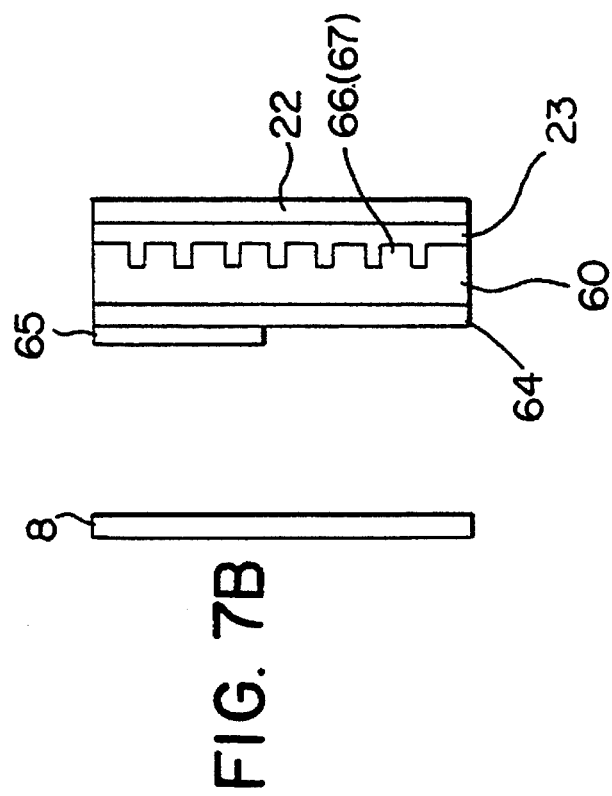

An optical shutter array member 60 is made of PLZT or like material having a large electrooptical effect and has a plate-like shape as shown in FIGS. 7A to 7C. The optical shutter array member 60 is formed with a plurality of projections 66 in the form of a laterally long rectangular parallelepiped at its downstream side surface with respect to its optical path. In recesses formed between projections 66, there are alternately formed a common electrode 61 and individual electrodes 62 (hatched portions in FIG. 7C) by means of the deposition or the like. Specifically, each individual electrode 62 is positioned between teeth of the comb-shaped common electrode 61.

The common electrode 61 is connected to a ground via a lead wire 61a, and the individual electrodes 62 are connected to a drive device 63 via lead wires 62a, respectively. An optical shutter element 67 is formed on each projection 66 between the tooth of the common electrode 61 and its corresponding individual electrode 62. When a voltage is applied to the projection 66 by the electrodes 61 and 62, the corresponding optical shutter element 67 is turned on. When no voltage is applied, the element 67 is turned off.

The optical path of the light passing through the optical shutter array member 60 is lengthened by the presence of the projection 66. Thus, it is possible to cause a large phase difference in the transmitted light with a small applied voltage.

The projections 66, electrodes 61 and 62 are covered with an insulation film 23. The film 23 serves as an insulator in case the electrodes 61 and 62 should be short-circuited by the presence of a reflection mirror 22 and is made of material which permits light to pass therethrough and insulates electricity. The reflection mirror 22 reflects the light passing through the optical shutter array member 60 and is formed by depositing a metal or the like on the surface of the insulation film 23.

A polarizer 8 is disposed on an incident side of the optical shutter array member 60. Since the light which has passed through the array member 60 is reflected by the reflection mirror 22 and passes back and forth through the array member 60, the length of the optical path is doubled. Thus, a half-wavelength voltage can be half as high as the one used for the aforementioned transmission type optical shutter array member. The polarizer 8 serves also as an analyzer. In the reflection type optical shutter array member, the optical shutter elements 67 transmit the light when no voltage is applied, while blocking the light when the half-wavelength voltage is applied.

In the case where the reflection mirror 22 is inclined in the depth direction of the surface of FIG. 6, i.e., the insulation film 23 is formed such that its thickness vary in the depth direction in FIG. 7B, the detector 12 may be disposed at a position before or beside the slit plate 2 in the depth direction of the surface of FIG. 6. This arrangement obviates the need for the semitransparent mirror 21.

As shown in FIGS. 8A to 8C, also, the optical shutter array member 60 may have the shape of a rectangular parallelepiped, and the comb-shaped common electrode 61 and the individual electrodes 62 may be arranged on the surface of the array member 60, each individual electrode 62 being located between two neighboring teeth of the common electrode 61, so that an optical shutter element 67 is formed between an individual electrode 62 and its corresponding tooth of the common electrode 61. In this way, the optical shutter array member 60 can be formed easily.

Figure 9:
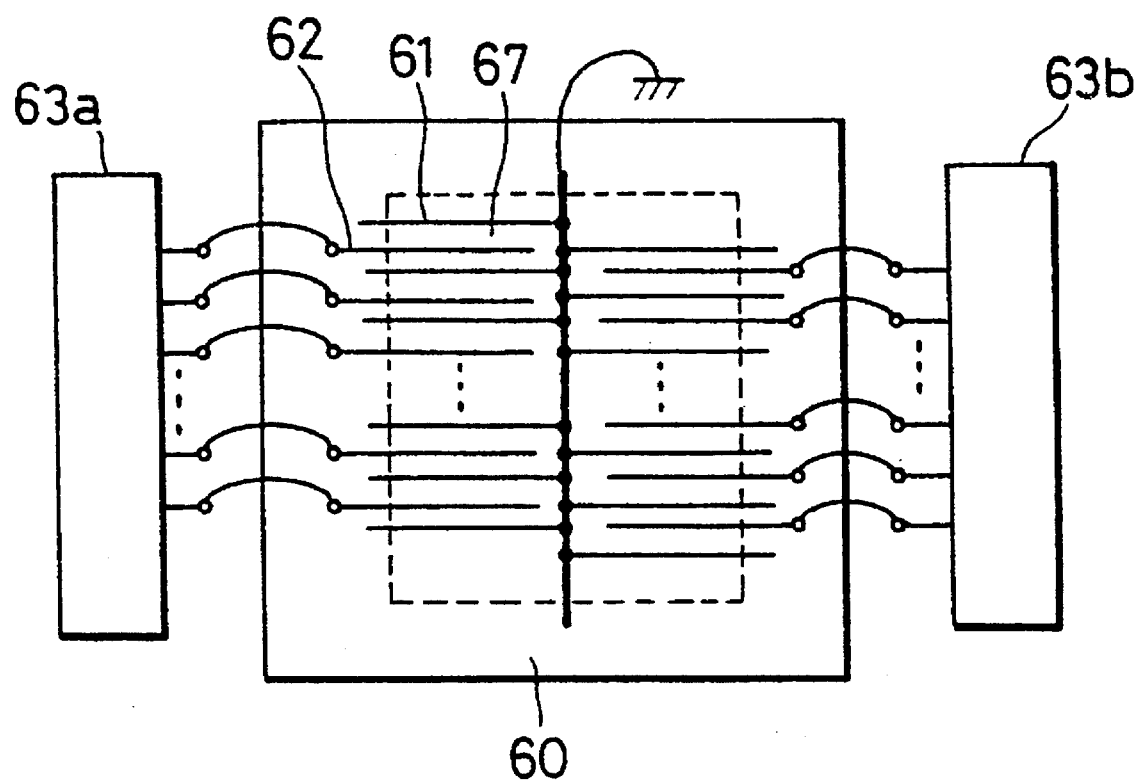
FIG. 9 is a front view showing a construction of an optical shutter array member of a third spectrometer embodying the invention.

A third spectrometer provided with an optical shutter will be described next with reference to FIG. 9. FIG. 9 is a front view showing a construction of an optical shutter array member 60 of the third spectrometer embodying the invention. It will be appreciated that like reference numerals are given to parts having like functions as those in the first embodiment.

In the third spectrometer, the optical shutter array member 60 is so constructed as to improve the resolving power.

Specifically, as shown in FIG. 9, a common electrode 61 has an earth line at the center and two groups of teeth extending from the earth line in opposite directions. One tooth of one group is shifted by half the pitch from the corresponding tooth of the other group. Each individual electrode 62 is arranged between two neighboring teeth of the same group of the common electrode 61. The individual electrodes 62 at the left side in FIG. 9 are connected to a drive device 63a, while those at the right side are connected to a drive device 63b.

With this construction, the pitch of an optical shutter element 67 can be narrowed to one half of the narrowest possible pitch. Thus, the spectrum resolving power can be doubled.

Figure 10:
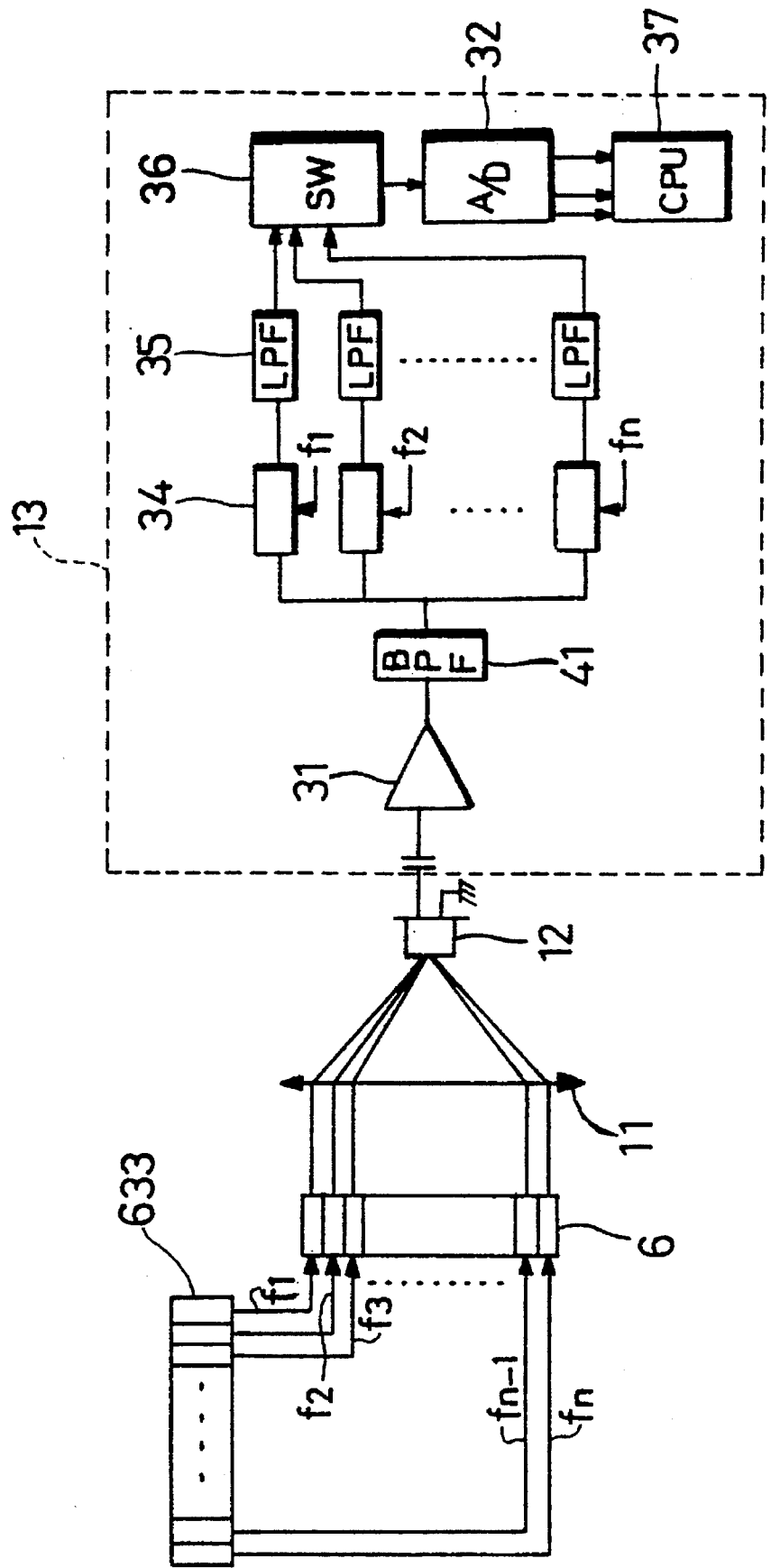
FIG. 10 is a circuit diagram showing a signal processor of a fourth spectrometer embodying the invention.

A fourth spectrometer provided with an optical shutter will be described with reference to FIG. 10. FIG. 10 is a circuit diagram showing a drive system and a signal processor 13 of the fourth spectrometer. It will be appreciated that like reference numerals are given to parts having like functions as those in the first embodiment.

In the fourth spectrometer, the optical shutter array member 60 includes n optical shutter elements and a drive device 633 applies a voltage to the i-th optical shutter element by outputting a voltage pulse having a frequency fi (where i=1, 2, . . . , n) to the i-th lead wire.

The signal processor 13 includes an amplifier 31, a band pass filter (BPF) 41, a synchronization detector 34, a smoothing circuit 35, an analog switch 36, an A/D converter 32, a CPU 37 and the like. There are n synchronization detectors 34 arranged in series to which an output from the amplifier 31 is fed. The i-th synchronization detector 34 synchronously detects the signal detected by the detector 12 with the frequency fi. The smoothing circuit 35 smooths the respective detected signals. The analog switch 36 outputs the smoothed signals sequentially to the A/D converter 32. The converter 32 converts into a digital value the received signal which is detected with the frequency fi and smoothed via a line corresponding to the frequency fi, and outputs it to the CPU 37. The CPU 37 calculates the intensity of the ray which has passed through the i-th optical shutter element, i.e., the intensity of the light for each wavelength.

Figure 11:
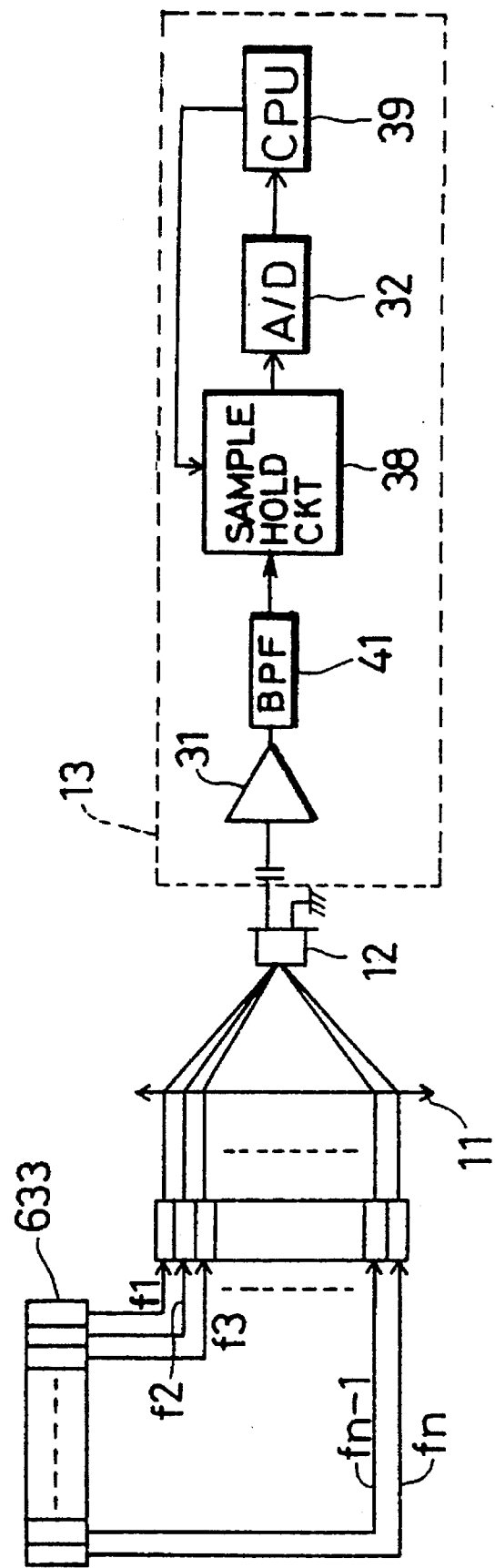
FIG. 11 is a circuit diagram showing a signal processor of a fifth spectrometer embodying the invention.

A fifth spectrometer provided with an optical shutter will be described next with reference to FIG. 11. FIG. 11 is a schematic construction diagram showing a drive system and a signal processor 13 for an optical shutter array member 60 of the fifth spectrometer. It will be appreciated that like reference numerals are given to parts having like functions as those in the first to fourth embodiments.

A sample hold circuit 38 holds only for a time T a signal which is detected by a detector 12 in accordance with a sampling pulse having a period T from a CPU 39 and input to the circuit 38 by way of an amplifier 31. An A/D converter 32 converts the signal held by the circuit 38 into a digital value, which is then fed to the CPU 39. The CPU 39 Fourier-transforms the received digital value and calculates the magnitude of the signal modulated with the frequency fi. In this way, the intensity of the ray which has passed through the i-th optical shutter element, i.e., the intensity of the light for each wavelength can be calculated.

Figure 12:
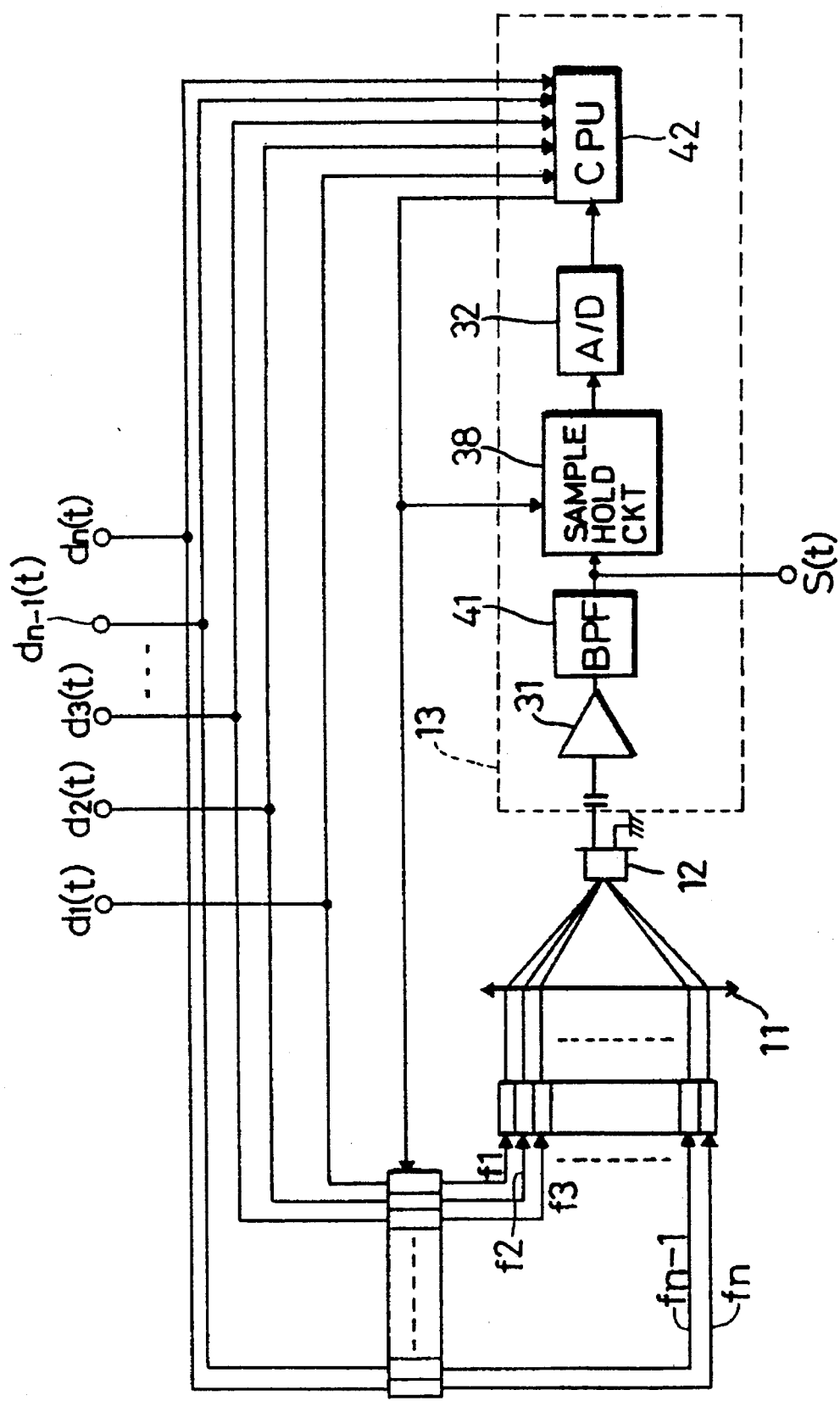
FIG. 12 is a circuit diagram showing a signal processor of a sixth spectrometer embodying the invention.
Figure 13:
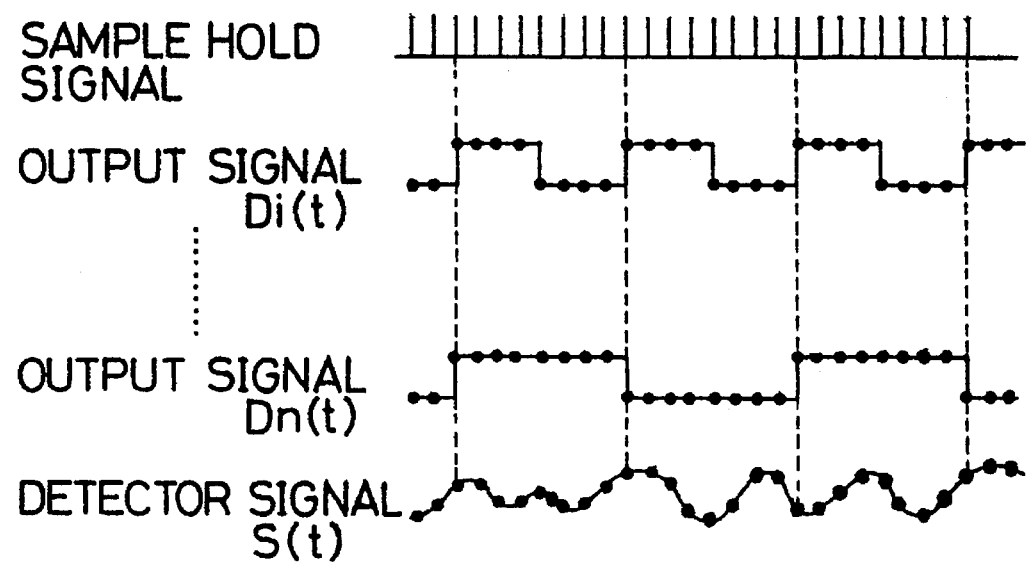
FIG. 13 is a chart showing a sample hold signal, an output signal from the drive device to an optical shutter element, and an output signal of a detector.

A sixth spectrometer provided with an optical shutter will be described next with reference to FIGS. 12 to 14. FIG. 12 is a schematic construction diagram showing a drive system and a signal processor 13 for an optical shutter array member 60 of the sixth spectrometer. It will be appreciated that like reference numerals are given to parts having like functions as those in the first to fifth embodiments.

In the sixth spectrometer, the optical shutter array member 60 includes n optical shutter elements. The signal processor 13 includes an amplifier 31, a BPF 41, a sample hold circuit 38, an A/D converter 32, a CPU 42, and the like. A drive device 634 outputs to the i-th lead wire a voltage signal Di(t) having a frequency fi (where i=1, 2, ...., n) as shown in FIG. 13 to thereby apply a voltage to the i-th optical shutter element, and sends an information as to whether the output signal Di(t) thereof is on or off in synchronism with a sampling pulse.

The BPF 41 is a filter for transmitting signal components in a frequency band between f1 and fn. The sample hold circuit 38 holds only for a time T a signal which is detected by a detector 12 in accordance with a sampling pulse having a period T, as shown in FIG. 13, from the CPU 42 and input to the circuit 38 by way of the amplifier 31 and BPF 41. The A/D converter 32 converts the analog signal held by the circuit 38 into a digital value, which is then fed to the CPU 42. The CPU 42 calculates the magnitude of the signal modulated with the frequency fi from the received digital value, and calculates the intensity of the ray which has passed through the i-th optical shutter element, i.e., the intensity of the light for each wavelength. The intensity of the ray which has passed through the i-th optical shutter element is calculated in accordance with the following equation (8). It should be noted that m is a value corresponding to a time constant.

$$Ii = \sum_{j=1}^{m} S(tj) \cdot Di(tj) \quad (8)$$

$$Di(t) = \begin{cases} 1 & (i\text{-th element is on}) \\ -1 & (i\text{-th element is off}) \end{cases}$$

Figure 14:
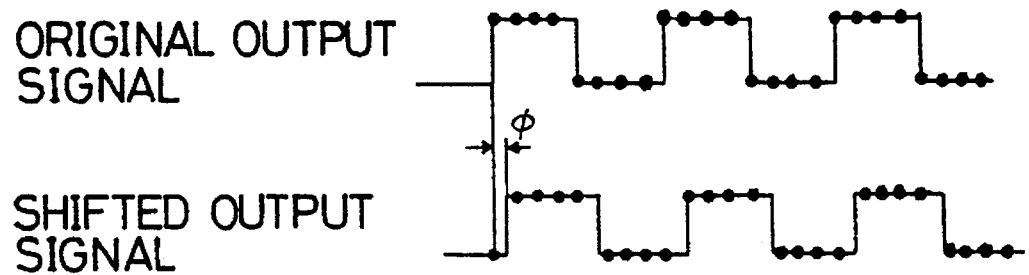
FIG. 14 is a chart showing an output signal of the drive device and a signal obtained by shifting the signal (a) by a phase $\phi$.

In the case where the phase of the output signal of the detector 12 is shifted by $\phi$ in the amplifier 31 and BPF 41, the CPU 42 may receive the output signal Di(t) of the drive device 634 while shifting the phase thereof by $\phi$ as shown in FIG. 14.

By performing the synchronization detection equivalently using a digital value, it becomes unnecessary to provide the synchronization detector as many as wavelengths to be measured, i.e., as-many as the optical shutter elements, with the result that the number of parts can be greatly reduced. Since the operation of the CPU 42 is basically only the addition and subtraction as seen from the equation (8), the CPU 42 can perform the operation rapidly.

As described above, according to the invention, rays diffracted in a wavelength direction are concentrated for respective specified bands and are caused to be incident upon respective optical shutter elements arrayed in correspondence with the positions of the respective bands. Each optical shutter element is turned on and off by applying a voltage corresponding to the band of the incident ray at a given timing. The rays which have passed through the optical shutters are again concentrated and an electrical signal according to the intensity of this transmitted light is detected. The intensity of the incident ray is calculated for each band in accordance with the detected electrical signal and the on-off information of the respective optical shutter elements. Further, the applied voltage is controlled based on the temperature of the optical shutter so that it will be at an optimal level. Thus, the use of an optical shutter having a high response speed leads to realization of a high performance spectrometer capable of responding at a high speed.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A spectrometer comprising:

diffracting means for diffracting an incident light according to wavelengths;

an optical shutter array member including a plurality of optical shutter elements, the optical shutter elements being:

arranged in correspondence with wavelength bands diffracted by the diffracting means;

operable to transmit an incident ray according to an applied voltage; and made of PLZT;

applying means for applying each optical shutter element with a voltage corresponding to the wavelength band of the ray incident upon the optical shutter element at a specified timing so that the ray passes through the optical shutter element, the application voltages for the bands differing from one another in accordance with wavelengths which fall within the respective bands;

processing means for receiving the ray which has passed through the optical shutter element and outputting an electrical signal according to the intensity of the received ray; and light intensity calculating means for calculating the intensity of the incident ray for each wavelength band in accordance with the electrical signal output from the processing means and the specified applying timing.

2. A spectrometer according to claim 1 wherein the applying means includes:

voltage calculation means for calculating for each band an application voltage necessary for the corresponding optical shutter element to transmit the ray having a wavelength which falls within this band; and voltage application means in responsive to the voltage calculation means for applying the calculated voltages to the respective optical shutter elements.

3. A spectrometer according to claim 2 wherein:

the applying means further includes temperature detecting means for detecting the temperature of the optical shutter array member; and the voltage calculation means for calculating an application voltage for each band in consideration of the detected temperature.

4. A spectrometer according to claim 1 wherein:

the applying means includes voltage application means for applying the optical shutter elements with their respective corresponding voltages at different applying intervals; and the light intensity calculating means includes converting means for converting electrical signal outputs from the processing means to digital data at specified sampling timings: and calculating means for calculating the intensity of the ray for each band by Fourier-transforming the digital data.

5. A spectrometer comprising:

diffracting means for diffracting an incident light according to wavelengths;

first condenser means for concentrating diffracted rays for specified wavelength bands;

an optical shutter array member including a plurality of optical shutter elements, the optical shutter elements being:

arranged at concentrated positions of the first condenser means in correspondence with specified wavelength bands;

operable to transmit an incident ray according to an applied voltage; and made of PLZT;

applying means for applying each optical shutter element with a voltage corresponding to the band of the ray incident upon the optical shutter element at a specified timing so that the ray passes through the optical shutter element, the application voltages for the bands differing from one another in accordance with wavelengths which fall within the respective bands;

second condenser means for concentrating the ray which has passed through the optical shutter element;

processing means for receiving the concentrated ray and outputting an electrical signal according to the intensity of the received ray; and light intensity calculating means for calculating the intensity of the incident ray for each band in accordance with the electrical signal output from the processing means and the specified applying timing.

6. A spectrometer according to claim 5 wherein the applying means includes:

voltage calculation means for calculating for each band an application voltage necessary for the corresponding optical shutter element to transmit the ray having a wavelength which falls within this band; and voltage application means in responsive to the voltage calculation means for applying the calculated voltages to the respective optical shutter elements.

7. A spectrometer according to claim 6 wherein:

the applying means further includes temperature detecting means for detecting the temperature of the optical shutter array member; and the voltage calculation means for calculating an application voltage for each band in consideration of the detected temperature.

8. A spectrometer according to claim 5 wherein:

the applying means includes voltage application means for applying the optical shutter elements with their respective corresponding voltages at different applying intervals; and the light intensity calculating means includes converting means for converting electrical signal outputs from the processing means to digital data at specified sampling timings; and calculating means for calculating the intensity of the ray for each band by Fourier-transforming the digital data.

9. A spectrometer comprising:

diffracting means for diffracting an incident light according to wavelengths;

an optical shutter array member including a plurality of optical shutter elements, the optical shutter elements being:

arranged in correspondence with wavelength bands diffracted by the diffracting means;

operable to block an incident ray according to an applied voltage; and made of PLZT;

applying means for applying each optical shutter element with a voltage corresponding to the band of the ray incident upon the optical shutter element at a specified timing so as to reflect the ray thereat, the application voltages for the bands differing from one another in accordance with wavelengths which fall within the respective bands;

processing means for receiving the ray reflected at the optical shutter element and outputting an electrical signal according to the intensity of the received ray; and light intensity calculating means for calculating the intensity of the incident ray for each band in accordance with the electrical signal output from the processing means and the specified applying timing.

10. A spectrometer according to claim 9 wherein the applying means includes:

voltage calculation means for calculating for each band an application voltage necessary for the corresponding optical shutter element to block the ray having a wavelength which falls within this band; and voltage application means in responsive to the voltage calculation means for applying the calculated voltages to the respective optical shutter elements.

11. A spectrometer comprising:

diffracting means for diffracting an incident light according to wavelengths;

first condenser means for concentrating diffracted rays for specified wavelength bands;

an optical shutter array member including a plurality of optical shutter elements, the optical shutter elements being:

arranged at concentrated positions of the first condenser means in correspondence with specified wavelength bands;

operable to block an incident ray according to an applied voltage; and made of PLZT;

applying means for applying each optical shutter element with a voltage corresponding to the band of the ray incident upon the optical shutter element at a specified timing so as to reflect the ray thereat, the application voltages for the bands differing from one another in accordance with wavelengths which fall within the respective bands;

second condenser means for concentrating the ray which has been reflected at the optical shutter element;

processing means for receiving the concentrated ray and outputting an electrical signal according to the intensity of the received ray; and light intensity calculating means for calculating the intensity of the incident ray for each band in accordance with the electrical signal output from the processing means and the specified applying timing.

12. A spectrometer according to claim 11, wherein the applying means includes:

voltage calculation means for calculating for each band an application voltage necessary for the corresponding optical shutter element to block the ray having a wavelength which falls within this band; and voltage application means in responsive to the voltage calculation means for applying the calculated voltages to the respective optical shutter elements.

13. A spectrometer comprising:

a diffractor by which an incident light is diffracted according to wavelengths;

an optical shutter array member including a plurality of optical shutter elements, the optical shutter elements being:

arranged in correspondence with wavelength bands diffracted by the diffractor;

operable to transmit an incident ray according to an applied voltage; and made of PLZT;

a voltage applicator by which each optical shutter element is applied with a voltage corresponding to the band of the ray incident upon the optical shutter element at a specified timing so that the ray passes through the optical shutter element, the voltage applicator including:

a voltage calculating device which calculates, for each band, an application voltage necessary for the corresponding optical shutter element to transmit the ray having a wavelength which falls within this band; and a voltage application device which is responsive to the voltage calculating device and applies the calculated voltages to the respective optical shutter elements;

a photosensor which receives the ray which has passed through the optical shutter element to output an electrical signal according to the intensity of the received ray; and a calculator by which the intensity of the incident ray for each band is calculated in accordance with the electrical signal output from the photosensor and the specified applying timing.

14. A spectrometer comprising:

a diffractor by which an incident light is diffracted according to wavelengths;

a first optical condenser to concentrate diffracted rays for specified wavelength bands;

an optical shutter array member including a plurality of optical shutter elements, the optical shutter elements being:

arranged at concentrated positions of the first optical condenser in correspondence with specific wavelength bands;

operable to transmit an incident ray according to an applied voltage; and made of PLZT;

a voltage applicator by which each optical shutter element is applied with a voltage corresponding to the band of the ray incident upon the optical shutter element at a specified timing so that the ray passes through the optical shutter element, the voltage applicator including:

a voltage calculating device which calculates for each band an application voltage necessary for the corresponding optical shutter element to transmit the ray having a wavelength which falls within this band; and a voltage application device which is responsive to the voltage calculating device and applies the calculated voltages to the respective optical shutter elements;

a second optical condenser to concentrate the ray which has passed through the optical shutter element;

a photosensor which receives the concentrated ray to output an electrical signal according to the intensity of the received ray; and a calculator by which the intensity of the incident ray for each band is calculated in accordance with the electrical signal output from the photosensor and the specified applying timing.

15. A spectrometer comprising:

a diffractor by which an incident light is diffracted according to wavelengths;

an optical shutter array member including a plurality of optical shutter elements, the optical shutter elements being:

arranged in correspondence with wavelength bands diffracted by the diffractor;

operable to block an incident ray according to an applied voltage; and made of PLZT;

a voltage applicator by which each optical shutter element is applied with a voltage corresponding to the band of the ray incident upon the optical shutter element at a specified timing so as to reflect the ray thereat, the voltage applicator including:

a voltage calculating device which calculates for each band an application voltage necessary for the corresponding optical shutter element to block the ray having a wavelength which falls within this band; and a voltage application device which is responsive to the voltage calculating device and applies the calculated voltages to the respective optical shutter elements;

a photosensor which receives the ray reflected at the optical shutter element to output an electrical signal according to the intensity of the received ray; and a calculator by which the intensity of the incident ray for each band is calculated in accordance with the electrical signal output from the photosensor and the specified applying timing.

16. A spectrometer comprising:

a diffractor by which an incident light is diffracted according to wavelengths;

a first optical condenser to concentrate diffracted rays for specified wavelength bands;

an optical shutter array member including a plurality of optical shutter elements, the optical shutter elements being:

arranged at concentrated positions of the first optical condenser in correspondence with specified wavelength bands;

operable to block an incident ray according to an applied voltage; and made of PLZT;

a voltage applicator by which each optical shutter element is applied with a voltage corresponding to the band of the ray incident upon the optical shutter element at a specified timing so as to reflect the ray thereat, the voltage applicator including:

a voltage calculating device which calculates for each band an application voltage necessary for the corresponding optical shutter element to block the ray having a wavelength which falls within this band; and a voltage application device which is responsive to the voltage calculating device and applies the calculated voltages to the respective optical shutter elements;

a second optical condenser to concentrate the ray which has been reflected at the optical shutter element;

a photosensor which receives the concentrated ray to output an electrical signal according to the intensity of the received ray; and a calculator by which the intensity of the incident ray for each band is calculated in accordance with the electrical signal output from the photosensor and the specified applying timing.

17. A spectrometer comprising:

diffracting means for diffracting an incident light according to wavelengths;

an optical shutter array member including a plurality of optical shutter elements, the optical shutter elements being:
  arranged in correspondence with wavelength bands diffracted by the diffracting means;
  operable to transmit an incident ray according to an applied voltage; and
  made of PLZT;

applying means for applying to each optical shutter element a voltage corresponding to the band of the ray incident upon the optical shutter element so that the ray passes through the optical shutter element, including:
  voltage calculation means for calculating, for each wavelength band, an application voltage necessary for the corresponding optical shutter element to transmit the incident ray having a wavelength which falls within this wavelength band; and
  voltage application means responsive to the voltage calculation means for applying the calculated voltages to the respective optical shutter elements;

processing means for receiving the ray which has passed through the optical shutter element and outputting an electrical signal according to the intensity of the received ray; and light intensity calculating means for calculating the intensity of the incident ray for each wavelength band in accordance with the electrical signal output from the processing means.

18. A spectrometer comprising:

diffracting means for diffracting an incident light according to wavelengths;

first condenser means for concentrating diffracted rays for specified wavelength bands;

an optical shutter array member including a plurality of optical shutter elements, the optical shutter elements being:
  arranged at concentrated positions of the first condenser means in correspondence with specified wavelength bands;
  operable to transmit an incident ray according to an applied voltage; and
  made of PLZT;

applying means for applying each optical shutter element with a voltage corresponding to the wavelength band of the ray incident upon the optical shutter element at a specified timing so that the ray passes through the optical shutter element, including:
  voltage calculation means for calculating, for each wavelength band, an application voltage necessary for the corresponding optical shutter element to transmit the incident ray having a wavelength which falls within this wavelength band; and
  voltage application means responsive to the voltage calculation means for applying the calculated voltages to the respective optical shutter elements;

second condenser means for concentrating the ray which has passed through the optical shutter element;

processing means for receiving the concentrated ray and outputting an electrical signal according to the intensity of the received ray; and light intensity calculating means for calculating the intensity of the incident ray for each wavelength band in accordance with the electrical signal output from the processing means and the specified applying timing.

19. A spectrometer comprising:

diffracting means for diffracting an incident light according to wavelengths;

an optical shutter array member including a plurality of optical shutter elements, the optical shutter elements being:
  arranged in correspondence with wavelength bands diffracted by the diffracting means;
  operable to block an incident ray according to an applied voltage; and
  made of PLZT;

applying means for applying each optical shutter element with a voltage corresponding to the wavelength band of the ray incident upon the optical shutter element at a specified timing so as to reflect the ray thereat, including:
  voltage calculation means for calculating, for each wavelength band, an application voltage necessary for the corresponding optical shutter element to block the incident ray having a wavelength which falls within this wavelength band; and
  voltage application means responsive to the voltage calculation means for applying the calculated voltages to the respective optical shutter elements;

processing means for receiving the ray reflected at the optical shutter element and outputting an electrical signal according to the intensity of the received ray; and light intensity calculating means for calculating the intensity of the incident ray for each band in accordance with the electrical signal output from the processing means and the specified applying timing.

20. A spectrometer comprising:

diffracting means for diffracting an incident light according to wavelengths;

first condenser means for concentrating diffracted rays for specified wavelength bands;

an optical shutter array member including a plurality of optical shutter elements, the optical shutter elements being:
  arranged at concentrated positions of the first condenser means in correspondence with specified wavelength bands;
  operable to block an incident ray according to an applied voltage; and
  made of PLZT;

applying means for applying each optical shutter element with a voltage corresponding to the wavelength band of the ray incident upon the optical shutter element at a specified timing so as to reflect the ray thereat, including:
  voltage calculation means for calculating, for each wavelength band, an application voltage necessary for the corresponding optical shutter element to block the incident ray having a wavelength which falls within this wavelength band; and
  voltage application means responsive to the voltage calculation means for applying the calculated voltages to the respective optical shutter elements;

second condenser means for concentrating the ray which has been reflected at the optical shutter element;

processing means for receiving the concentrated ray and outputting an electrical signal according to the intensity of the received ray; and light intensity calculating means for calculating the intensity of the incident ray for each wavelength band in accordance with the electrical signal output from the processing means and the specified applying timing.

* * * * *